United States Patent
Sato

(10) Patent No.: US 9,704,524 B2
(45) Date of Patent: Jul. 11, 2017

(54) MAGNETIC RECORDING MEDIUM AND MAGNETIC SIGNAL REPRODUCING DEVICE

(71) Applicant: FUJIFILM Corporation, Tokyo (JP)

(72) Inventor: Masahide Sato, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/084,828

(22) Filed: Mar. 30, 2016

(65) Prior Publication Data

US 2016/0293196 A1    Oct. 6, 2016

(30) Foreign Application Priority Data

Mar. 31, 2015  (JP) .................................. 2015-073958

(51) Int. Cl.
  *G11B 5/708* (2006.01)
  *G11B 5/714* (2006.01)
  *G11B 5/82* (2006.01)
  *G11B 5/733* (2006.01)

(52) U.S. Cl.
  CPC ............. *G11B 5/708* (2013.01); *G11B 5/714* (2013.01); *G11B 5/733* (2013.01); *G11B 5/82* (2013.01)

(58) Field of Classification Search
  None
  See application file for complete search history.

(56) References Cited

U.S. PATENT DOCUMENTS

| | | | | | |
|---|---|---|---|---|---|
| 4,320,159 | A | * | 3/1982 | Ogawa | G11B 5/7028 428/331 |
| 4,420,532 | A | * | 12/1983 | Yamaguchi | G11B 5/7085 252/62.54 |
| 5,935,700 | A | * | 8/1999 | Enomoto | B29D 7/01 428/328 |
| 8,188,209 | B2 | * | 5/2012 | Naiki | C08G 18/3234 525/408 |
| 8,535,817 | B2 | | 9/2013 | Imaoka | |
| 2011/0052908 | A1 | | 3/2011 | Imaoka | |
| 2012/0196156 | A1 | * | 8/2012 | Suzuki | G11B 5/70 428/844 |
| 2013/0260179 | A1 | * | 10/2013 | Kasada | G11B 5/7085 428/840.2 |
| 2014/0287271 | A1 | * | 9/2014 | Sato | G11B 5/708 428/843.1 |

FOREIGN PATENT DOCUMENTS

JP    2011-048878 A    3/2011
JP    2014-209403 A    11/2014

* cited by examiner

*Primary Examiner* — Kevin Bernatz
(74) *Attorney, Agent, or Firm* — Sughrue Mion, PLLC

(57) ABSTRACT

The magnetic recording medium has a nonmagnetic layer containing nonmagnetic powder and binder on a nonmagnetic support, and a magnetic layer containing ferromagnetic powder and binder on the nonmagnetic layer,
  wherein a thickness of the nonmagnetic layer ranges from 0.10 to 0.60 μm; and the magnetic layer further contains nonmagnetic filler satisfying equation 1 below and having a Vickers hardness of less than or equal to 122 N/mm²:

$$1.150 \leq D2/D1 \leq 1.300 \qquad \text{Equation 1:}$$

wherein, in equation 1, D1 is a value, with a unit of μm, obtained from equation 2 below:

$$D1 = \frac{6}{\rho \cdot S}, \qquad \text{Equation 2}$$

D2 is an average particle size, with a unit of μm, of the nonmagnetic filler, and
in equation 2, ρ denotes a density, with a unit of g/cm³, of the nonmagnetic filler and S denotes a specific surface area, with a unit of m²/g, of the nonmagnetic filler.

19 Claims, No Drawings

MAGNETIC RECORDING MEDIUM AND MAGNETIC SIGNAL REPRODUCING DEVICE

CROSS-REFERENCE TO RELATED APPLICATIONS

This application claims priority under 35 U.S.C 119 to Japanese Patent Application No. 2015-073958 filed on Mar. 31, 2015. The above application is hereby expressly incorporated by reference, in its entirety.

BACKGROUND OF THE INVENTION

Field of the Invention

The present invention relates to a magnetic recording medium and a magnetic signal reproducing device.

A particulate magnetic recording medium comprises a magnetic layer containing ferromagnetic powder and binder on a nonmagnetic support. A nonmagnetic layer containing nonmagnetic powder and binder may be provided between the nonmagnetic support and the magnetic layer.

Nonmagnetic filler has conventionally been incorporated along with ferromagnetic powder in the magnetic layer of a particulate magnetic recording medium (for example, see Japanese Unexamined Patent Publication (KOKAI) No. 2014-209403 or English language family member US2014/287271A1 and Japanese Unexamined Patent Publication (KOKAI) No. 2011-48878 or English language family members US2011/052908A1 and U.S. Pat. No. 8,535,817, which are expressly incorporated herein by reference in their entirety

SUMMARY OF THE INVENTION

The nonmagnetic filler that is contained in the magnetic layer functions to control the shape of the surface of the magnetic layer. When the coefficient of friction rises during signal recording and reproduction (during running) while the magnetic head is in contact with the surface of the magnetic layer, the running stability decreases and noise increases. As a result, the electromagnetic conversion characteristic (the signal-to-noise ratio (SNR)) ends up dropping. By contrast, controlling the shape of the surface of the magnetic layer by means of nonmagnetic filler lowers the coefficient of friction and improves running stability. As a result, it becomes possible to achieve a good electromagnetic conversion characteristic (SNR).

In recent years, as data backup technology has become widespread, the duration of use of a magnetic recording medium has tended to increase. Under such circumstances, there is a need to maintain a good electromagnetic conversion characteristic not just during the initial running period, but during repeated running of the magnetic recording medium.

An aspect of the present invention provides for a magnetic recording medium that is capable of maintaining a good electromagnetic conversion characteristic both during the initial running period and during repeated running.

The present inventor conducted extensive research into achieving the above object. As a result, they discovered the following magnetic recording medium:

A magnetic recording medium, having a nonmagnetic layer containing nonmagnetic powder and binder on a nonmagnetic support, and having a magnetic layer comprising ferromagnetic powder and binder on the nonmagnetic layer, wherein the thickness of the nonmagnetic layer falls within a range of 0.10 to 0.60 μm; and the magnetic layer further comprises nonmagnetic filler satisfying equation 1 below and having a Vickers hardness of less than or equal to 122 N/mm²:

$$1.150 \leq D2/D1 \leq 1.300 \quad \text{Equation 1:}$$

where in equation 1, D1 is a value (unit: μm) obtained from equation 2 below:

$$D1 = \frac{6}{\rho \cdot S}, \quad \text{Equation 2}$$

D2 is the average particle size (unit: μm) of the nonmagnetic filler, and in equation 2, ρ denotes the density (unit: g/cm³) of the nonmagnetic filler and S denotes the specific surface area (unit: m²/g) of the nonmagnetic filler.

The above magnetic recording medium affords a good electromagnetic conversion characteristic both during initial running and during repeated running. The present inventor presumes that this occurs for the following reasons.

In general, the nonmagnetic fillers that are contained in the magnetic layer can be roughly divided into those that primarily serve the function of controlling the surface shape of the magnetic layer in the manner set forth above and those that primarily serve the polishing function of removing deposits that adhere to the magnetic reproduction head (simply referred to as the "head" hereinafter) during running (head-cleaning property). These nonmagnetic fillers are normally distinguished based on hardness. Generally, nonmagnetic fillers that primarily serve the first function are softer than those that primarily serve the second function. The magnetic recording medium of an aspect of the present invention contains nonmagnetic filler serving the first function in the form of nonmagnetic filler with a Vickers hardness of less than or equal to 122 N/mm².

Japanese Unexamined Patent Publication (KOKAI) No. 2014-209403 discloses nonmagnetic filler serving the first function in the form of a spherical substance such as inorganic oxide particles. Paragraph 0015 of Japanese Unexamined Patent Publication (KOKAI) No. 2014-209403 describes that an ideal spherical shape is one having a sphericity—calculated as "(average value of major axis diameter)/(average value of minor axis diameter)"—of 1.0.

The use of nonmagnetic filler serving the first function (described as nonmagnetic powder in Japanese Unexamined Patent Publication (KOKAI) No. 2011-48878) and having a high degree of sphericity is stated as being desirable in paragraph 0020 of Japanese Unexamined Patent Publication (KOKAI) No. 2011-48878.

In the present invention and present Specification, the term "nonmagnetic filler" is synonymous with "nonmagnetic powder, and means an aggregation of multiple nonmagnetic particles. The term "aggregation" includes forms in which binder, additives, and the like, described further below, are present between the particles, and is not limited to forms in which the constituent particles are in direct contact. The term "particles" is also sometimes used to denote powder. The above is applied in the same manner to any powders in the present invention and described in the present Specification. With regard to the "D2/D1" that is calculated by equation 1 above, the present inventor assumes that the "D2/D1" is an index which indicates that the nonmagnetic particles constituting the nonmagnetic filler (aggregation of nonmagnetic particles) having a Vickers hardness of less than or equal to 122 N/mm² have a shape approaching on average a plan view circle, with suitable variation in shape. That is, "D2/D1" is an index that differs from the sphericity described in Japanese Unexamined Patent Publication (KOKAI) No. 2014-209403 and Japanese Unexamined Patent Publication (KOKAI) No. 2011-48878, which simply indicates that the shape of the nonmagnetic particles constituting the nonmagnetic filler is close to that of a plan view circle. That fact the present inventor has discovered through extensive research was that a magnetic recording medium having a magnetic layer containing nonmagnetic filler in which "D2/D1" falls within the range set forth above on a nonmagnetic layer 0.1 to 0.60 µm in thickness affords a good electromagnetic conversion characteristic both during initial running and during repeated running.

However, the above is merely a presumption of the present inventor and is not intended to limit the present invention in any way.

In the present invention and Specification, the above physical properties are values that are defined and measured as follows.

The "Vickers hardness" is a value that is measured by the method specified by JIS Z 2244: 2009. The measurement is conducted in a measurement environment of a temperature of 10 to 35° C. The measurement is conducted with a hardness tester commonly referred to as a microhardness tester and a cube corner indenter made of diamond. By way of example, a model TI-950 triboindenter made by Hysitron Corp. can be employed as the microhardness tester. The load (unit: kgf) applied to the sample being measured is divided by the area (mm²) of the mark made by the diamond indenter to calculate the Vickers hardness as a value in units of kgf/mm². The value obtained is multiplied by an SI unit system conversion factor of 0.102 to obtain the Vickers hardness as a value in units of N/mm². In the present invention and Specification, the conversion value is a value that has been rounded off to the right of the decimal point. When the nonmagnetic filler exists as a powder (for example, when nonmagnetic filler for use as a material in the nonmagnetic layer is available), the powder is employed as a measurement sample to measure the Vickers hardness. For nonmagnetic filler that is contained in the magnetic layer of a magnetic recording medium, since the nonmagnetic filler will normally be exposed on some portion of the magnetic layer surface, it suffices to measure the Vickers hardness of the exposed portion. For example, the position of the nonmagnetic filler is determined in advance by microscopic observation (for example, by observation by scanning electron microscopy) and marked. Subsequently, the Vickers hardness is measured at the marked position to measure the Vickers hardness of the nonmagnetic filler contained in the magnetic layer.

The "specific surface area" is a value that is obtained by the nitrogen adsorption method (also known as the Brunauer-Emmett-Teller (BET) single point method), and is measured for primary particles. The specific surface area obtained by this method will also be referred to as the BET specific surface area below.

The "density" is calculated by dividing the weight (unit: g) of the nonmagnetic filler by the volume (unit: cm³). Measurement is conducted by the method of Archimedes.

The "average particle size D2 of nonmagnetic filler with a Vickers hardness of less than or equal to 122 N/mm²" refers to a value that is measured method by transmission electron microscopy by the following method.

The nonmagnetic filler is imaged at a magnification of 60,000-fold with a transmission electron microscope. The image is printed on photographic paper to obtain a photograph of the nonmagnetic particles (also referred to as "particles" hereinafter) constituting the nonmagnetic filler. Target particles are selected in the photograph of the particles that has been obtained, and a digitizer is used to trace the contours of the particles (primary particles). The term "primary particles" refers to independent particles that have not aggregated. The diameter of a circle of identical area to the traced region (diameter of identical area circle) is calculated. The particle size of the nonmagnetic filler refers to the diameter calculated in this manner.

This measurement is conducted for 300 particles that are randomly extracted. The arithmetic average of the particle size of 300 particles thus obtained is adopted as the average particle size of the nonmagnetic filler. By way of example, a model H-9000 transmission electron microscope built by Hitachi can be employed as the transmission electron microscope. The particle size can be measured with known image analysis software, such as Carl Zeiss KS-400 image analysis software.

In the present invention and the present Specification, the "average particle size of nonmagnetic filler with a Vickers hardness of less than or equal to 122 N/mm²" refers to the average particle size as calculated by the above method. The average particle size D2 indicated in the examples given further below is a value obtained with a transmission electron microscope in the form of a model H-9000 transmission electron microscope made by Hitachi and image analysis software in the form of KS-400 image analysis software produced by Carl Zeiss under scale correction during image analysis and image reading by the scanner made for a circle 1 cm in diameter. The average particle size of other powders is measured as set forth further below.

In one embodiment, the nonmagnetic filler is in the form of colloidal particles. In the present invention and present Specification, the term "colloidal particles" refers to particles that can be dispersed without settling to prepare a colloidal dispersion when one gram is added per 100 mL of at least one organic solvent comprising at least methyl ethyl ketone, cyclohexanone, toluene, or ethyl acetate, or a mixed solvent of two or more of these solvents in any blending ratio.

In one embodiment, the nonmagnetic filler is silica colloidal particles.

In one embodiment, the quantity of sodium that is extracted into water from the nonmagnetic layer and magnetic layer (also referred to as the "sodium extraction quantity" hereinafter) is less than or equal to 100.0 parts per million (ppm) based on weight. The above quantity of sodium is a value that can be determined by the following method:

(1) Scraping off the magnetic layer and nonmagnetic layer from the nonmagnetic support of a magnetic recording medium that is to be measured. The scraping can be done, for example, with a razor blade.
(2) Weighing the measurement sample that has been obtained by scraping. The measurement sample is mixed with pure water in a flask in a ratio of 100 g of pure water per gram of measurement sample.
(3) Mounting a reflux condenser to the flask and boiling the mixture for 1 hour while stirring.

(4) Allowing the mixture to cool to room temperature and then removing the solid fraction (residue of the magnetic recording medium) from the flask.

(5) Quantifying the sodium concentration of the liquid (extraction, also referred to as the "sample solution" hereinafter) in the flask. Quantification can be conducted by the inductively coupled plasma (ICP) spectroscopy method. When the quantity of liquid of the sample solution does not satisfy the quantity required for ICP measurement, it suffices to add a suitable quantity of pure water.

(6) Based on the quantification results obtained in (5) above, the quantity of sodium in the sample solution is obtained. From the quantity of sodium (g) and weight (g) of the measurement sample weighed in (2) above, the value of the ((quantity of sodium in the sample solution)/(weight of the measurement sample))×$10^6$ (unit: ppm) is calculated. This value is then adopted as the quantity of sodium (based on weight) extracted into water from the nonmagnetic layer and magnetic layer.

In one embodiment, the magnetic layer further comprises nonmagnetic filler with a Vickers hardness of greater than or equal to 123 N/mm².

In one embodiment, the nonmagnetic filler with a Vickers hardness of greater than or equal to 123 N/mm² is alumina.

In one embodiment, D2 falls within a range of 50 to 200 nm. The D2 that is used to calculate "D2/D1" is a value in units of μm.

In one embodiment, the thickness of the magnetic layer falls within a range of 10 to 100 nm.

In one embodiment, the average particle size of the ferromagnetic powder falls within a range of 10 to 50 nm.

A further aspect of the present invention relates to a magnetic signal reproducing device comprising the above magnetic recording medium and a magnetic reproduction head.

In one embodiment, the reproduction element width of the magnetic reproduction head falls within a range of 0.09 to 1.00 μm.

The present invention can provide a magnetic recording medium affording good electromagnetic conversion characteristic both during initial running and during repeated running; and a magnetic signal reproducing device equipped with the magnetic recording medium.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

[Magnetic Recording Medium]

An aspect of the present invention relates to a magnetic recording medium having a nonmagnetic layer containing nonmagnetic powder and binder on a nonmagnetic support, and having a magnetic layer comprising ferromagnetic powder and binder on the nonmagnetic layer, where the thickness of the nonmagnetic layer falls within a range of from 0.10 to 0.60 μm and the magnetic layer further comprises nonmagnetic filler satisfying equation 1 above, with a Vickers hardness of less than or equal to 122 N/mm².

The magnetic recording medium will be described in greater detail below.

<Thickness of the Nonmagnetic Layer>

The thickness of the nonmagnetic layer that is contained in the magnetic recording medium of an aspect of the present invention falls within a range of 0.10 to 0.60 μm. The presence of a magnetic layer containing the nonmagnetic filler that is described further below on the nonmagnetic layer having a thickness falling within the above range makes it possible to afford a good electromagnetic conversion characteristic both during initial running and during repeated running. The present inventor attributes this to the fact that the nonmagnetic filler having a Vickers hardness of less than or equal to 122 N/mm² that is contained in the magnetic layer on the nonmagnetic layer having a thickness falling within the above range makes it possible to properly control (reduce the coefficient of friction by causing suitable protrusion from the surface of the magnetic layer) the surface shape of the magnetic layer. Having the thickness of the nonmagnetic layer falling within the range set forth above, especially being less than or equal to 0.60 μm, is thought to contribute to reducing the long-period components of several μm units on the surface of the magnetic recording medium. Reducing the long-period components reduces the noise signal (called skirt noise) of the skirt portion of the peak waveform of the output signal. As a result, it is possible to enhance the ratio of the output signal strength to the noise signal strength—or SNR—. The ratio of the output signal strength to the noise signal strength in the form of the SNR is called the SNRsk (sk being an abbreviation of skirt). The thickness of the nonmagnetic layer preferably falls within a range of 0.20 to 0.50 μm, and more preferably, falls within a range of 0.25 to 0.46 μm.

The thickness of the various layers and nonmagnetic support in the present invention and present Specification is determined by known film thickness measurement methods. As an example of such a method, the cross-section in the direction of thickness of a magnetic recording medium is exposed by a known technique such as the use of an ion beam or microtome. The exposed cross-section is then observed by scanning electron microscopy. Various types of thickness can be determined, such as the thickness at one spot in the direction of thickness in sectional observation, or the average of the thickness determined at multiple—two or more—spots. It is also possible to calculate the thickness of the various layers as a designed thickness computed from the manufacturing conditions. The thickness given in the examples set forth further below is the designed thickness.

<Nonmagnetic Filler Having a Vickers Hardness of Less Than or Equal to 122 N/mm²>
(Vickers Hardness)

The Vickers hardness of the nonmagnetic filler is less than or equal to 122 N/mm². A Vickers hardness of 122 N/mm² is a value that is obtained by converting 1,200 kgf/mm² to the SI unit system by the above calculation. The nonmagnetic filler with a Vickers hardness of less than or equal to 122 N/mm² serves the function of controlling the surface shape of the nonmagnetic layer, as set forth above. Controlling the surface shape of the magnetic layer makes it possible to achieve a good electromagnetic conversion characteristic. From the perspective of further enhancing the electromagnetic conversion characteristic, the Vickers hardness of the nonmagnetic filler desirably falls within a range of 66 to 122 N/mm² (650 to 1,200 kgf/mm²), and preferably falls within a range of 71 to 117 N/mm² (700 to 1,150 kgf/mm²).

The Vickers hardness, the density of the nonmagnetic filler for calculating equation 2, the specific surface area, and the average particle size can be measured for nonmagnetic filler that exists in the form of a powder. Additionally, the nonmagnetic filler contained in the magnetic layer can be removed from the magnetic layer and used for these various measurements. The nonmagnetic filler can be removed from the magnetic layer by the following method.

Method of Removing Nonmagnetic Filler from Magnetic Layer

1. Scraping off about 1 g of magnetic layer. The scraping can be done with a razor blade, for example.
2. Placing the magnetic layer sample that has been obtained by scraping in a container such as an eggplant-shaped flask and adding 100 mL of tetrahydrofuran to the container. Tetrahydrofuran comes in the form of commercial products to which a stabilizer has been added, and in the form of commercial products without stabilizer. A tetrahydrofuran to which no stabilizer has been added is used. The same applies to the tetrahydrofuran that is employed for washing further below.
3. Mounting a reflux condenser on the container and heating the contents for 90 minutes in a bath at a water temperature of 60° C. Filtering with filter paper the contents of the container after heating, washing several times with tetrahydrofuran the solid component that has remained on the filter paper, and transferring the solid component to a container such as a beaker following washing. 4N (4 mol/L) hydrochloric acid aqueous solution is added to the container and non-dissolved residue is collected by filtration with a filter. A filter with a pore diameter smaller than 0.05 µm is employed. For example, a membrane filter (such as an MF Millipore made by Merck Corp.) that is employed in chromatographic analysis can be employed. Washing the residue that has been removed by filtration with a filter several times with pure water and then drying it.

Dissolving the ferromagnetic powder and organic material (binder and the like) obtained by the above operation and recovering the nonmagnetic filler as a residue (powder).

Nonmagnetic filler can be extracted from the magnetic layer by the above process. Since the particles are hardly damaged at all by the above processing, the various physical properties of nonmagnetic filler that has been in a magnetic layer can be measured by the methods set forth above.

When multiple types of nonmagnetic filler are contained in the nonmagnetic filler that is thus extracted, the multiple types of nonmagnetic filler are separated by differences in density. As an example, when nonmagnetic filler recovered from a magnetic layer containing nonmagnetic filler with a Vickers hardness of less than or equal to 122 N/mm² in the form of silica colloidal particles, described further below, and another nonmagnetic filler in the form of alumina is added to 1,1,2,2-tetrabromoethane (specific gravity 2.967), the silica colloidal particles float without settling on the 1,1,2,2-tetrabromoethane, and the alumina settles out. Accordingly, the particles floating on the 1,1,2,2-tetrabromoethane can be scooped out to recover the colloidal particles. Subsequently, the particles that have settled out can be separated from the 1,1,2,2-tetrabromoethane by a known solid-liquid separation method to recover the alumina. The particles that have been recovered can be cleaned with an organic solvent such as benzene and then subjected to various measurements.

(Description of Equation 1)

The nonmagnetic filler with a Vickers hardness of less than or equal to 122 N/mm² that is contained in the magnetic layer satisfies equation 1 below. That is, "D2/D1" falls within a range of 1.150 to 1.300. D1, which is calculated using equation 2, described further below, is the average particle size when the nonmagnetic particles (also referred to as "particles" hereinafter) constituting the nonmagnetic filler are assumed to be spherical. The ratio "D2/D1", which is the ratio of the average particle size D2 obtained by actually observing with an electron scanning microscope the nonmagnetic filler by the method set forth above to D1, becomes 1.00 if there is absolutely no particle size distribution to the nonmagnetic filler and the particles constituting the nonmagnetic filler are all spherical. As set forth above, the present inventor assumes that the value of "D2/D1" is an index which indicates that the nonmagnetic particles constituting the nonmagnetic filler having a Vickers hardness of less than or equal to 122 N/mm² have a shape approaching on average a plan view circle, with suitable variation in shape. A magnetic recording medium in which a magnetic layer containing nonmagnetic filler having a Vickers hardness of less than or equal to 122 N/mm² and a value of "D2/D1" falling within a range of 1.150 to 1.300 (that is, satisfying equation 1) is provided on a nonmagnetic layer of the thickness set forth above will afford a good electromagnetic conversion characteristic both during initial running and during repeated running. From the perspective of achieving an even better electromagnetic conversion characteristic both during initial running and during repeated running, the value of "D2/D1" is desirably greater than or equal to 1.190, and preferably greater than or equal to 1.200. From the same perspective, the value of "D2/D1" is desirably less than or equal to 1.240 and preferably less than or equal to 1.230.

Equation 1 is desirably equation 1-1 below, and preferably equation 1-2 below.

$$1.190 \leq D2/D1 \leq 1.240 \quad \text{Equation 1-1:}$$

$$1.200 \leq D2/D1 \leq 1.230 \quad \text{Equation 1-2:}$$

In equations 1, D1 is a value (unit: μm) calculated by equation 2:

$$D1 = \frac{6}{\rho \cdot S}.$$  Equation 2

In equation 2, D2 denotes the average particle size (unit: μm) of the nonmagnetic filler, ρ denotes the density (unit: g/cm$^3$) of the nonmagnetic filler, and S denotes the specific surface area (unit: m$^2$/g) of the nonmagnetic filler. The methods used to measure these values are as set forth above. Details regarding desirable ranges and the like are given further below.

The "D2/D1" of the nonmagnetic filler with a Vickers hardness of less than or equal to 122 N/mm$^2$ can be controlled through the method of manufacturing the nonmagnetic filler or the like. A specific example of the control method is given further below.

From the perspectives of higher density recording and the stability of magnetization, the average particle size D2 of the nonmagnetic filler desirably falls within a range of 50 to 200 nm, preferably within a range of 70 to 150 nm.

The specific surface area S of the above nonmagnetic filler normally varies in inverse proportion to the average particle size D2 (as one of the values increases, the other decreases). The specific surface area S of the nonmagnetic filler desirably falls within a range of 20.0 to 30.2 m$^2$/g, preferably within a range of 23.0 to 27.0 m$^2$/g, and more preferably, within a range of 24.0 to 26.0 m$^2$/g. D2 and S can be adjusted by means of the manufacturing conditions of the nonmagnetic filler.

The density ρ of the nonmagnetic filler falls, for example, within a range of 1.6 to 6.0 g/cm$^3$, and can be established by means of the materials constituting the nonmagnetic filler.

(Specific forms of the nonmagnetic filler with a Vickers hardness of less than or equal to 122 N/mm$^2$).

The nonmagnetic filler with a Vickers hardness of less than or equal to 122 N/mm$^2$ can be either an inorganic powder or an organic powder so long as it satisfies equation 1. It is desirably an inorganic powder. Examples of inorganic powders are powders such as metal oxides, metal carbonates, metal sulfates, metal nitrides, metal carbides, and metal sulfates. Inorganic oxide powders are desirable. Examples of inorganic oxides are α-alumina with an α conversion rate of greater than or equal to 90%, β-alumina, γ-alumina, θ-alumina, silicon dioxide, silicon carbide, chromium oxide, cerium oxide, α-iron oxide, goethite, corundum, silicon nitride, titanium carbide, titanium dioxide, tin oxide, magnesium oxide, tungsten oxide, zirconium oxide, born nitride, zinc oxide, calcium carbonate, calcium sulfate, barium sulfate, and molybdenum disulfide, as well as composite oxides of two or more of the above.

From the perspective of dispersion, the nonmagnetic filler is desirably employed in the form of a colloidal particle. Since colloidal particles are stably present in a dispersed state in a dispersion medium, the use of a colloidal solution when preparing a magnetic layer-forming composition makes it possible to disperse the colloidal particles well in the magnetic layer-forming composition. From the perspective of availability, colloidal particles in the form of inorganic colloidal particles are desirable and inorganic oxide colloidal particles are preferred. The above inorganic oxide colloidal particles are examples of inorganic oxide colloidal particles. Examples of composite inorganic oxide colloidal particles are $SiO_2 \cdot Al_2O_3$, $SiO_2 \cdot B_2O_3$, $TiO_2 \cdot CeO_2$, $SnO_2 \cdot Sb_2O_3$, $SiO_2 \cdot Al_2O_3 \cdot TiO_2$, and $TiO_2 \cdot CeO_2 \cdot SiO_2$. Examples of desirable inorganic colloidal particles are $SiO_2$, $Al_2O_3$, $TiO_2$, $ZrO_2$, and $Fe_2O_3$. Silica colloidal particles (colloidal silica) are preferred. Since the surfaces of colloidal particles are generally hydrophilic, they are suited to the preparation of colloidal solutions with water as the dispersion medium. For example, since the surface of colloidal silica obtained by common synthesis methods is covered with polarized oxygen atoms ($O^{2-}$), it adsorbs water when placed in water, forming hydroxyl groups and stabilizing. However, in the organic solvents that are commonly employed in magnetic layer-forming compositions, these particles tend not to remain present in colloidal form. By contrast, the definition of the colloidal particles in the present invention and present Specification is particles that disperse without settling and that form colloidal dispersions when added in a quantity of 1 g per 100 mL of the above-described organic solvents. Such colloidal particles can be prepared by known methods, such as by rendering the surface hydrophobic or the like by a surface treatment. Details describing such hydrophobic treatments are described, for example, in Japanese Unexamined Patent Publication (KOKAI) Heisei Nos. 5-269365 and 5-287213, and Japanese Unexamined Patent Publication (KOKAI) No. 2007-63117.

When investigating desirable colloidal particles in the form of silica colloidal particles (colloidal silica), the present inventor revealed that the value of "D2/D1" differed with the manufacturing method. This will be described below.

The water glass method and the sol-gel method are two methods of fabricating colloidal silica that are generally known. The colloidal silica that has been investigated to date as nonmagnetic filler in magnetic recording media has been mostly manufactured by the water glass method. In the water glass method, sodium silicate (such as sodium silicate, known as water glass) is employed as a starting material that is ion exchanged to produce active silicic acid and accordingly grow particles. In the sol-gel method, a tetraalkoxysilane is employed as a starting material that is hydrolyzed in the presence of a basic catalyst while simultaneously growing particles. Based on investigation by the present inventor, the silica colloidal particles obtained by the water glass method tend to exhibit a "D2/D1" value that exceeds 1.300. By contrast, the value of "D2/D1" with the sol-gel method was found to yield silica colloidal particles that satisfied equation 1 by having a "D2/D1" value falling within the range of 1.150 to 1.300. Accordingly, in one embodiment, the nonmagnetic filler having a Vickers hardness of less than or equal to 122 N/mm$^2$ is a silica colloidal particle obtained by the sol-gel method. The external appearance of colloidal particles obtained by the sol-gel method clearly differs from that of silica colloidal particles obtained by the water glass method. The surface of the former is smoother than the surface of the latter. Thus, for example, observation at 100,000-fold magnification by scanning electron microscopy can be used to readily distinguish the former from the latter. In the sol-gel method, for example, manufacturing conditions such as the composition of the reaction solvent employed in the sol-gel method (for example, the mixing ratio of water and alcohol), the reaction temperature, and the reaction time can be adjusted to control the value of "D2/D1". Reference can be made to known techniques of manufacturing colloidal silica by the sol-gel method, such as Japanese Unexamined Patent Publication (KOKAI) No. 2005-162533. However, colloidal silica manufactured by the sol-gel method has not previously been employed as nonmagnetic filler in the magnetic layer in a magnetic recording medium. Further, controlling the value of "D2/D1" by adjusting the manufacturing conditions in the sol-gel method was conducted for the first time ever by the present inventor in the course of devising the present invention.

(Content)

It suffices to set the content of the nonmagnetic filler with a Vickers hardness of less than or equal to 122 N/mm$^2$ in the magnetic layer to within a range that increases the running stability and enhances the electromagnetic conversion characteristic by lowering the coefficient of friction. It is desirably 1.0 to 4.0 weight parts, preferably 1.5 to 3.5 weight parts, per 100.0 weight parts of ferromagnetic powder. In the present invention, a single type of a given component, or two or more types of differing structure or material, can be incorporated. The content when two or more types of a component are incorporated refers to the combined contents of the component.

<Quantity of Sodium Extracted>

In a desirable embodiment of the magnetic recording medium, the quantity of sodium extracted that is calculated by the method set forth above is less than or equal to 100.0 ppm based on weight. The present inventor assumes that this makes it possible to further inhibit a drop in the electromagnetic conversion characteristic during repeated running. Since water is used to conduct extraction in the method set forth above, the quantity of sodium measured denotes the quantity of water-soluble sodium. Water-soluble sodium is thought to cause the adhesion of sodium salt to the magnetic reproduction head during recording and reproduction. An increase in the quantity of sodium salt deposited during repeated running is thought to be one factor that compromises the electromagnetic conversion characteristic. The quantity of sodium is preferably less than or equal to 50 ppm, more preferably less than or equal to 30 ppm. Since the sodium derives from the various components contained in the magnetic recording medium (the portion introduced by starting materials), its reduction is possible by suitably selecting for use components that introduce little sodium. By way of example, the quantity of sodium is less than or equal to 10 ppm. However, the lower the quantity of sodium, the better, so the quantity of sodium can be less than 10 ppm. In this regard, since the above-mentioned water glass method employs sodium silicate, colloidal silica containing sodium salt as a by-product is often obtained. In a magnetic recording medium having a magnetic layer containing such colloidal silica as nonmagnetic filler, the quantity of sodium extracted will often exceed 100.0 ppm based on weight. By contrast, the sol-gel method makes it possible to obtain colloidal silica in which the quantity of sodium extracted is less than or equal to 100.0 ppm based on weight.

<Other Nonmagnetic Fillers that can be Incorporated into the Magnetic Layer>

The magnetic recording medium of an aspect of the present invention contains nonmagnetic filler in the form of the above-described nonmagnetic filler in the magnetic layer. However, it also desirably contains nonmagnetic filler with a higher Vickers hardness than such nonmagnetic filler. That is, the magnetic layer desirably contains nonmagnetic filler with a Vickers hardness of greater than or equal to 123 N/mm$^2$. Hereinafter, nonmagnetic filler with a Vickers hardness of less than or equal to 122 N/mm$^2$ will sometimes be referred to as "soft filler" and nonmagnetic filler with a Vickers hardness of greater than or equal to 123 N/mm$^2$ will sometimes be referred to as "hard filler" or "abrasive." By controlling the surface shape of the magnetic layer, soft filler can contribute to enhancing the electromagnetic conversion characteristic. By contrast, hard filler can function as an abrasive.

The Vickers hardness of the hard filler (abrasive) is greater than or equal to 123 N/mm$^2$. From the perspective of achieving both a head cleaning property and diminishing head abrasion, it desirably falls within a range of 153 to 510 N/mm$^2$ (1,500 to 5,000 kgf/mm$^2$), preferably within a range of 204 to 408 N/mm$^2$ (2,000 to 4,000 kgf/mm$^2$). Examples of hard fillers include the various inorganic powders that are commonly employed as abrasives in the magnetic layer. Specific examples are alumina ($Al_2O_3$), silicon carbide, boron carbide ($B_4C$), TiC, chromium oxide ($Cr_2O_3$), cerium oxide, zirconium oxide ($ZrO_2$), iron oxide, and diamond powder. Of these, alumina and silicon carbide are desirable, and alumina is preferred. These inorganic powders can be of any shape, such as acicular, spherical, or cubic. Those having partially angular shapes are desirable due to their highly abrasive property. The content of hard filler in the magnetic layer is not specifically limited. A content of 1.0 to 20.0 weight parts per 100.0 weight parts of ferromagnetic powder is desirable from the perspective of achieving both a head-cleaning effect and decreasing abrasion.

Specific embodiments of the magnetic layer will be described in detail next.

Specific Embodiments of the Magnetic Layer (Ferromagnetic Powder)

The various powders that are commonly employed as ferromagnetic powders in the magnetic layer of magnetic recording media can be employed as the ferromagnetic powder. The use of a ferromagnetic powder of small average particle size is desirable from the perspective of increasing the recording density of the magnetic recording medium. For this reason, it is desirable to employ a ferromagnetic powder with an average particle size of less than or equal to 50 nm as the ferromagnetic powder. From the perspective of stability of magnetization, the average particle size of the ferromagnetic powder is desirably greater than or equal to 10 nm.

The average particle size of the ferromagnetic powder is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention, the average particle size of the powder, such as ferromagnetic powder and various kinds of powder except for the above soft filler, is the average particle size as obtained by the above method unless specifically stated otherwise. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention, the size of the particles constituting powder such as ferromagnetic powder (referred to as the "particle size", hereinafter) except for the above soft filler is denoted as follows based on the shape of the particles observed in the above particle photograph:
(1) When acicular, spindle-shaped, or columnar (with the height being greater than the maximum diameter of the bottom surface) in shape, the particle size is denoted as the length of the major axis constituting the particle, that is, the major axis length.
(2) When platelike or columnar (with the thickness or height being smaller than the maximum diameter of the plate surface or bottom surface) in shape, the particle size is denoted as the maximum diameter of the plate surface or bottom surface.
(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

Ferromagnetic hexagonal ferrite powder is a specific example of desirable ferromagnetic powder. From the perspectives of achieving higher density recording and magnetization stability, the average particle size (average plate diameter) of ferromagnetic hexagonal ferrite powder desirably ranges from 10 nm to 50 nm, preferably 20 nm to 50 nm. Reference can be made to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is also a specific example of desirable ferromagnetic powder. From the perspectives of achieving higher density recording and magnetization stability, the average particle size (average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powder. The contents of the above publications are expressly incorporated herein by reference in their entirety.

The content (fill rate) of ferromagnetic powder in the magnetic layer desirably falls within a range of 50 to 90 weight %, and preferably falls within a range of 60 to 90 weight %. A high fill rate is desirable from the perspective of increasing the recording density.

(Binder and Curing Agent)

The magnetic recording medium of an aspect of the present invention contains binder along with the ferromagnetic powder in the magnetic layer. One or a mixture of multiple resins from among polyurethane resins, polyester resins, polyamide resins, vinyl chloride resins, acrylic resins obtained by copolymerization of styrene, acrylonitrile, methyl methacrylate and the like, cellulose resins such as nitrocellulose, epoxy resins, phenoxy resins, polyvinyl alkyral resins such as polyvinyl acetal and polyvinyl butyral, can be employed as binder. Of these, desirable examples are polyurethane resins, acrylic resins, cellulose resins, and vinyl chloride resins. These resins can be employed as binders in the nonmagnetic layer and backcoat layer, described further below. Reference can be made to paragraphs 0028 to 0031 of Japanese Unexamined Patent Publication (KOKAI) No. 2010-24113, which is expressly incorporated herein by reference in its entirety, regarding the above binder. Curing agents can be employed with suitable resins as the above binder. Polyisocyanate is suitable as a curing agent. Reference can be made to paragraphs 0124 and 0125 in Japanese Unexamined Patent Publication (KOKAI) No. 2011-216149 regarding polyisocyanate. The curing agent is employed, for example, in a quantity of 0 to 80.0 weight parts, desirably in a quantity of 50.0 to 80.0 weight parts from the perspective of enhancing the strength of the coating of the magnetic layer and the like, per 100.0 weight parts of binder.

(Other Additives and Solvents)

Additives can be added to the magnetic layer as needed. Examples of additives are lubricants, dispersing agents, dispersion adjuvants, antifungal agents, antistatic agents, oxidation inhibitors, and carbon black. The additives can be suitably selected for use from among commercial products based on the properties desired. The compositions (coating liquids) for forming the various layers, including the magnetic layer, normally contain solvents. The various organic solvents normally employed in the manufacturing of magnetic recording media can be employed without limitation. One or more of the organic solvents described for colloidal particles above is desirably employed as at least a portion of the organic solvent.

The magnetic layer set forth above is provided over a nonmagnetic layer on the nonmagnetic support. Details regarding the nonmagnetic layer and the nonmagnetic support will be given further below.

<Nonmagnetic Layer>

In the magnetic recording medium of an aspect of the present invention, a nonmagnetic layer containing nonmagnetic powder and binder is present between the nonmagnetic support and the magnetic layer. The thickness of the nonmagnetic layer is as set forth above.

The nonmagnetic powder that is employed in the nonmagnetic layer can be an organic or an inorganic substance. Carbon black or the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content (fill rate) of nonmagnetic powder in the nonmagnetic layer desirably falls within a range of 50 to 90 weight %, preferably within a range of 60 to 90 weight %.

For other details regarding binder, additives, and the like in the nonmagnetic layer, known techniques relating to nonmagnetic layers can be applied. As a further example, known techniques relating to magnetic layers can be applied with regard to the quantity and type of binders and the quantity and type of additives.

The nonmagnetic layer of the magnetic recording medium of an aspect of the present invention may be in the form of an essentially nonmagnetic layer containing small quantities of ferromagnetic powder, either in the form of impurities or by intention, for example, along with nonmagnetic powder. In the present invention, the term "essentially nonmagnetic layer" refers to a layer with a residual magnetic flux density of less than or equal to 10 mT or a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

<Backcoat Layer>

In the magnetic recording medium of an aspect of the present invention, a backcoat layer containing nonmagnetic powder and binder can be present on the opposite side of the nonmagnetic support from the side on which the magnetic layer is present. Carbon black and inorganic powder are desirably incorporated into the backcoat layer. Known techniques relating to the formulas of the magnetic layer and the nonmagnetic layer can be applied to the binder that is contained, and the various additives that can be optionally contained, in the backcoat layer.

<Nonmagnetic Support>

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

<Thicknesses of Nonmagnetic Support, Magnetic Layer, and Backcoat Layer>

The thickness of the nonmagnetic support and various layers in the magnetic recording medium of an aspect of the present invention are as follows. The thickness of the nonmagnetic support is, for example, 3.00 to 80.00 µm, desirably 3.00 to 50.00 µm, and preferably 3.00 to 10.00 µm.

The thickness of the magnetic layer, which can be optimized for the saturation magnetization of the magnetic head employed, the head gap length, and the bandwidth of the recording signal, is generally 10 to 100 nm. From the perspective of high-density recording, it is desirably 20 to 90 nm), and preferably 30 to 70 nm. The magnetic layer can be comprised of a single layer, or the magnetic layer can be separated into two or more layers with different magnetic characteristics. Known multilayer magnetic layer structures can be applied.

The thickness of the nonmagnetic layer is as set forth above.

The thickness of the backcoat layer is desirably less than or equal to 0.90 µm, preferably 0.10 to 0.70 µm.

<Manufacturing Process>

(Preparation of Various Layer Forming Compositions)

The process of preparing the compositions for forming the various layers, such as the magnetic layer, nonmagnetic layer, and backcoat layer, normally includes at least a kneading step, a dispersion step, and mixing steps provided before and after these steps as needed. Each of these steps can be divided into two or more stages. All of the starting materials in the form of ferromagnetic powder, binder, soft filler, hard filler (abrasive), nonmagnetic powder, carbon black, antistatic agent, lubricant, solvent, and the like that are employed in the present invention can be added at the start, or part way through, any of these steps. An individual starting material can be divided for addition in two or more steps. For example, binder can be divided up and added in the kneading step, dispersing step, and in a kneading step after the dispersing step for viscosity adjustment. To manufacture the above magnetic recording medium, conventionally known manufacturing techniques can be employed. An open kneader, continuous kneader, pressurized kneader, extruder, or some other device with powerful kneading force is desirably employed in the kneading step. Details regarding these kneading processes are given in Japanese Unexamined Patent Publication (KOKAI) Heisei Nos. 1-106338 and 1-79274, which are expressly incorporated herein by reference in their entirety. Glass beads or some other form of bead can be employed to disperse the compositions for forming the various layers. High-density dispersion beads in the form of zirconia beads, titania beads, and steel beads are suitable as such dispersion beads. The particle diameter and fill rate of these dispersion beads can be optimized for use. A known disperser can be employed.

(Coating Step)

The magnetic layer can be formed by sequentially or simultaneously multilayer coating the magnetic layer-forming composition and the nonmagnetic layer-forming composition. The backcoat layer can be formed by coating the backcoat layer on the opposite side of the nonmagnetic support from the side on which the magnetic layer is present (or on the side on which a magnetic layer is provided later). For details regarding the coatings to form the various layers, reference can be made to paragraph 0066 of Japanese Unexamined Patent Publication (KOKAI) No. 2010-231843, which is expressly incorporated herein by reference in its entirety.

(Other Steps)

For various other steps in manufacturing the magnetic recording medium, reference can be made to paragraphs 0067 to 0070 of Japanese Unexamined Patent Publication (KOKAI) No. 2010-231843.

The above-described magnetic recording medium of an aspect of the present invention can afford a good electromagnetic conversion characteristic both during initial running and during repeated running.

[Magnetic Signal Reproducing Device]

A further aspect of the present invention relates to a magnetic signal reproducing device comprising the above magnetic recording medium and a magnetic reproduction head.

So long as the above magnetic recording medium of an aspect of the present invention is contained as the magnetic recording medium in the magnetic signal reproducing device of an aspect of the present invention, known techniques can be applied without limitation for the remainder.

A desirable embodiment is a magnetic signal reproducing device equipped with a magnetic reproduction head in which the reproduction element width falls within a range from 0.09 to 1.00 μm. The reproduction element width preferably falls within a range of 0.1 to 0.75 μm, and more preferably falls within a range of 0.2 to 0.6 μm. The reproduction element width is generally referred to as the read width. As the recording density has increased (higher density recording has been achieved) in recent years, narrowing of the reproduction element width is desirable to increase the track density.

As set forth above, narrowing of the reproduction element width of the magnetic reproduction head is desirable from the perspective of achieving higher density recording. However, the narrower the reproduction element width is made, the more the signal output normally tends to drop. The reason for this is as follows. For example, denoting as 100% the signal output when a reproduction element of reproduction element width 1 (a relative value, not an absolute value) passes over a portion in which nonmagnetic filler is not present, the signal output drops to 50% when the particle size of the nonmagnetic filler is 0.5 relative to the reproduction element width of 1, and drops to 30% when it is 0.7. That is, when the same magnetic recording medium is employed, the narrower the reproduction track width of the magnetic reproduction head employed in combination with the magnetic recording medium is made, the more the signal output tends to drop. Points where the output drops are determined as signal dropouts. When the signal can no longer be determined at some threshold value, the error rate (called the "bit error rate") increases. Accordingly, to reduce the bit error rate, it is desirable for the particle size of the soft filler to be of suitable size relative to the reproduction element width. It is also desirable for a soft filler without large variation in particle size to be contained in the magnetic layer. From these perspectives, in a magnetic signal reproducing device equipped with a magnetic reproduction head with a reproduction element width falling within a range of 0.09 to 1.00 μm, it is desirable for the soft filler that is contained in the magnetic layer of the magnetic recording medium to satisfy equation 1, more specifically, for the value of "D2/D1" to be less than or equal to 1.300. It is also desirable for the average particle size of the soft filler to be 50 to 200 nm.

For details regarding the structure and the like of the magnetic signal reproducing device, reference can be made to paragraphs 0072 and 0073 of Japanese Unexamined Patent Publication (KOKAI) No. 2010-231843.

EXAMPLES

The present invention will be described based on examples below. However, the present invention is not intended to be limited by the embodiments described in the examples. The "parts" and "%" indicated below denote "weight parts" and "weight %" unless specifically indicated otherwise.

The term "under ordinary pressure" referred to below denotes under atmospheric pressure without pressure regulation. "Room temperature" denotes a range of 20 to 25° C.

1. Examples of Synthesizing Colloidal Silica by the Sol-Gel Method

Synthesis Example 1

A mixed solution of 800 g of pure water, 170 g of 26% ammonia water, and 4,000 g of methanol was prepared as Solution A. Solution B in the form of a mixed solution containing 3,000 g of tetramethoxysilane (TMOS) and 600 g of methanol, and a mixed solution containing 600 g of pure water and 170 g of 26% ammonia water were added dropwise to Solution A over 150 minutes while maintaining solution temperatures of 35° C. The solution temperature will be referred to as the reaction temperature and the period of dropwise addition will be referred to as the Solution A dropwise addition period below.

When the dropwise addition had ended, the mixed solution was concentrated to 3,000 mL. A silane coupling agent in the form of 10 g of methyl trimethoxysilane was added, the mixture was heated and distilled under ordinary pressure, and the distillate was passed through an ion-exchange tower to remove the ammonia. An operation in which the distillate was returned to its original solution was then continued until pH became at 8.0. Subsequently, while conducting heating and distillation under ordinary temperature, methyl ethyl ketone was added dropwise to maintain the volume. The point in time where the water content became less than or equal to 1.0% was adopted as the end point. The mixture was cooled to room temperature and filtered using a membrane filter with a pore diameter of 3 μm. Methyl ethyl ketone was again added to achieve a silica concentration of 20%. The dispersion thus obtained will be referred to as "Colloidal Silica A" below.

Synthesis Examples 2 to 11

Colloidal Silicas A to J indicated in Table 1 were obtained with the composition of Solution A, reaction temperature, and Solution A dropwise addition period indicated in Table 1 and the remainder being the same as in Synthesis Example 1.

2. Measurement of the specific surface area by the BET method

The colloidal silica obtained was dried to obtain a powder and a roughly 0.1 g quantity was collected. The specific surface area of the collected powder (silica colloid particles) was measured by the nitrogen adsorption method (BET 1 point method) with a specific surface area measuring device (Macsorb 1208 made by Mountech Corp.).

3. Density measurement

Powder obtained in the same manner as in 2. above was employed to calculate the density ρ of the silica colloid particles contained in the colloidal silica by the method of Archimedes. The density ρ of the silica colloid particles contained in each of the colloidal silicas was 2.2 g/cm$^3$.

4. Measurement of average particle size D2

Each of the colloidal silicas obtained in the synthesis examples was diluted 100-fold with methyl ethyl ketone and dried on a mesh used for observation in transmission electron microscopy. Subsequently, the average particle size D2 was determined by the method set forth above.

5. Calculation of D1

Using the values obtained in 2 and 3 above, D1 was calculated from equation 2, and using D2 obtained in 4 above, "D2/D1" was computed.

<Nonmagnetic Layer-Forming Composition>

Colcothar (average particle size: 0.15 μm, average acicular ratio: 7, BET specific surface area: 52 m²/g): 75 parts

TABLE 1

| | | Composition of Solution A | | | | | | | |
|---|---|---|---|---|---|---|---|---|---|
| | Colloidal Silica | Pure water (g) | Methanol (g) | 26% ammonia water (g) | reaction temp. | Solution A Dropwise addition period | Specific surface area S (m²/g) | D1 (μm) | Average particle size D2 (μm) | D2/D1 |
| Synthesis Ex. 1 | Colloidal Silica A | 800 | 4000 | 170 | 35° C. | 150 min | 23.1 | 0.118 | 0.152 | 1.287 |
| Synthesis Ex. 2 | Colloidal Silica B | 800 | 4000 | 170 | 35° C. | 150 min | 22.7 | 0.120 | 0.150 | 1.249 |
| Synthesis Ex. 3 | Colloidal Silica C | 770 | 4030 | 170 | 35° C. | 150 min | 25.7 | 0.106 | 0.131 | 1.234 |
| Synthesis Ex. 4 | Colloidal Silica D | 770 | 4030 | 170 | 35° C. | 150 min | 25.7 | 0.106 | 0.130 | 1.225 |
| Synthesis Ex. 5 | Colloidal Silica E | 780 | 4020 | 170 | 35° C. | 150 min | 24.4 | 0.112 | 0.137 | 1.226 |
| Synthesis Ex. 6 | Colloidal Silica F | 780 | 4020 | 170 | 35° C. | 150 min | 24.1 | 0.113 | 0.138 | 1.219 |
| Synthesis Ex. 7 | Colloidal Silica G | 760 | 4040 | 170 | 35° C. | 150 min | 26.5 | 0.103 | 0.125 | 1.215 |
| Synthesis Ex. 8 | Colloidal Silica H | 790 | 4010 | 170 | 35° C. | 150 min | 22.4 | 0.122 | 0.145 | 1.191 |
| Synthesis Ex. 9 | Colloidal Silica I | 770 | 4030 | 170 | 35° C. | 150 min | 25.3 | 0.108 | 0.127 | 1.178 |
| Synthesis Ex. 10 | Colloidal Silica J (employed in Comp. Ex.) | 820 | 3980 | 170 | 25° C. | 150 min | 19.9 | 0.137 | 0.180 | 1.313 |
| Synthesis Ex. 11 | Colloidal Silica K (employed in Comp. Ex.) | 770 | 4030 | 170 | 25° C. | 10 hr | 24.9 | 0.110 | 0.125 | 1.141 |

The above physical properties were similarly calculated for the colloidal silicas employed in Comparative Examples 1 to 3 described further below.

The Vickers hardness of the silica colloid particles contained in the colloidal silicas employed in the various examples and comparative examples was 112 N/mm² (1,100 kgf/mm²) and the Vickers hardness of the alumina employed in the magnetic layer was 214 N/mm² (2,100 kgf/mm²).

6. Examples and Comparative Examples Relating to the Magnetic Recording Medium

Examples 1 to 13

<Magnetic Layer-Forming Composition>
(Magnetic liquid)
Ferromagnetic barium ferrite powder: 100 parts (coercivity Hc: 175 kA/m (2,200 Oe), average particle size: 27 nm)
Oleic acid: 2 parts
Vinyl chloride copolymer (MR-104 made by Zeon Corp.): 10 parts
Sulfonic acid group-containing polyester polyurethane resin (UR-4800 made by Toyobo): 4 parts
Methyl ethyl ketone: 150 parts
Cyclohexanone: 150 parts
(Abrasive (hard filler) liquid)
α-Alumina with specific surface area of 19 m²/g: 6 parts
Sulfonic acid group-containing polyester polyurethane resin (UR-4800 made by Toyobo): 0.6 part
Cyclohexanone: 23 parts
(Soft filler liquid)
Colloidal silica (see Table 2): 10 parts
  (2 Parts as solid fraction of silica colloid particles)
(Lubricant and curing agent liquid)
Stearic acid: 2 parts
Stearamide: 0.3 part
Butyl stearate: 6 parts
Methyl ethyl ketone: 110 parts
Cyclohexanone: 110 parts
Polyisocyanate (Coronate L made by Nippon Polyurethane Industry Co., Ltd.): 3 parts Carbon black (average primary particle size: 16 nm; amount of DBP (dibutyl phthalate) oil absorption: 74 cm³/100 g): 25 parts
Phenyl phosphonic acid: 3 parts
Vinyl chloride copolymer (MR-104 made by Zeon Corp.): 12 parts
Sulfonic acid group-containing polyester polyurethane resin (UR-8401 made by Toyobo): 8 parts
Methyl ethyl ketone: 370 parts
Cyclohexanone: 370 parts
Stearic acid: 1 part
Stearamide: 0.3 part
Butyl stearate: 2 parts
Polyisocyanate (Coronate L made by Nippon Polyurethane Industry Co., Ltd.): 5 parts
<The Backcoat Layer-Forming Composition>
Carbon black (average primary particle size: 40 nm; amount of DBP oil absorption: 74 cm³/100 g): 100 parts
Copper phthalocyanine: 3 parts
Nitrocellulose: 25 parts
Sulfonic acid group-containing polyester polyurethane resin (UR-8401 made by Toyobo): 60 parts
Polyester resin (Vylon 500 made by Toyobo): 4 parts
α-Alumina with specific surface area of 17 m²/g: 1 part
Polyisocyanate (Coronate L made by Nippon Polyurethane Industry Co., Ltd.): 15 parts
Methyl ethyl ketone: 600 parts
Toluene: 600 parts
  <Preparation of Various Layer-Forming Compositions>
  The above magnetic liquid was kneaded and diluted by processing in an open kneader. Subsequently, in a vertical bead mill disperser, employing zirconia (ZrO₂) beads (referred to as "Zr beads" hereinafter) 0.1 mm in diameter, 30 passes of dispersion processing were conducted at a bead fill rate of 80 volume %, a rotor tip peripheral speed of 10 m/s, and a single pass residence time of 2 minutes.
  The abrasive liquid was prepared as a mixture of alumina: sulfonic acid group-containing polyester urethane resin (UR-4800 made by Toyobo):cyclohexanone=100:10:380 (weight ratio). This mixture was then placed in a vertical bead mill disperser with Zr beads 0.3 mm in diameter and adjusted to a bead volume/(abrasive liquid volume+bead volume) of 80 volume %. Bead mill dispersion processing was conducted for 120 minutes. The liquid was removed following processing and a flow type ultrasonic dispersion filtration device was used to conduct ultrasonic dispersion and filtration processing.

The magnetic liquid, abrasive liquid, soft filler liquid, and other components in the form of a lubricant and curing agent liquid were charged to a dissolver stirring apparatus and stirring was conducted for 30 minutes at a peripheral speed of 10 m/s. Subsequently, three passes of processing were conducted at a flow rate of 7.5 kg/minute in a flow type ultrasonic disperser, followed by filtration with a filter having a pore diameter of 1 µm to prepare a magnetic layer-forming composition.

The nonmagnetic layer-forming composition was prepared by the following method.

The above components excluding the lubricants (stearic acid, stearamide, and butyl stearate) and the polyisocyanate were kneaded and diluted in an open kneader. Subsequently, dispersion processing was conducted in a vertical bead mill disperser. Subsequently, the lubricants and polyisocyanate were added and the mixture was stirred and mixed in a dissolver stirring apparatus to prepare a nonmagnetic layer-forming composition.

The backcoat layer-forming composition was prepared by the following method.

The above components excluding the polyisocyanate were charged to a dissolver stirring apparatus and the mixture was stirred for 30 minutes at a peripheral speed of 10 m/s. Subsequently, dispersion processing was conducted in a vertical bead mill disperser. Subsequently, the polyisocyanate was added and stirring and mixing were conducted in a dissolver stirring apparatus to prepare a backcoat layer-forming composition.

<Preparation of a Magnetic Recording Medium (Magnetic Tape)>

The nonmagnetic layer-forming composition was coated and dried so as to yield the dry thickness indicated in Table 2 on a polyethylene naphthalene support 6.00 µm in thickness. Subsequently, the backcoat layer-forming composition was coated and dried so as to yield a dry thickness of 0.50 µm on the opposite surface of the support. The support was wound up and subjected to a heat treatment for 36 hours in an environment with an atmospheric temperature of 70° C.

Following the heat treatment, the magnetic layer-forming composition was coated and dried to a dry thickness of 45 nm on the nonmagnetic layer.

Subsequently, a surface flattening treatment was conducted at a calender roll surface temperature of 100° C. at a linear pressure of 300 kg/cm (294 kN/m) at a rate of 40 m/min with calender rolls comprised solely of metal rolls. Subsequently, a heat treatment was conducted for 36 hours in an environment with an atmospheric temperature of 70° C.

Following the heat treatment, the product was slit to ½ inch (0.0127 meter) width. Following slitting, the surface of the magnetic layer was cleaned with a tape cleaning device on which a sapphire blade and a nonwoven cloth had been mounted so as to press against the magnetic layer surface, yielding a magnetic recording medium (magnetic tape, also referred to as a "tape" hereinafter).

Comparative Example 1

A magnetic recording medium was obtained in the same manner as in Example 1 with the exceptions that colloidal silica prepared by the water glass method was employed instead of Colloidal Silica A in the magnetic layer-forming composition in Example 1 and the thickness of the nonmagnetic layer was made 0.10 µm.

Comparative Example 2

A magnetic recording medium was obtained in the same manner as in Example 1 with the exceptions that colloidal silica prepared by the water glass method (MEK-ST-ZL made by Nissan Chemical Industries, Ltd.) was employed instead of Colloidal Silica A in the magnetic layer-forming composition in Example 1 and the thickness of the nonmagnetic layer was made 1.00 µm.

Comparative Example 3

A magnetic recording medium was obtained in the same manner as in Comparative Example 2 with the exception that the thickness of the nonmagnetic layer was changed from 1.00 µm to 0.45 µm in Comparative Example 2.

Comparative Example 4

A magnetic recording medium was obtained in the same manner as in Example 1 with the exception that Colloidal Silica A was replaced with Colloidal Silica J in Example 1.

Comparative Example 5

A magnetic recording medium was obtained in the same manner as in Example 1 with the exception that Colloidal Silica A was replaced with Colloidal Silica K in Example 1.

Comparative Example 6

A magnetic recording medium was obtained in the same manner as in Example 4 with the exception that the thickness of the nonmagnetic layer was changed to 0.80 µm in Example 4.

7. Evaluation methods (1) Measurement of initial SNRsk

The SNRsk was measured by the following method using a ½ inch (0.0127 meter) reel tester to which a head had been secured. The relative speed of the head/tape was set to 5.5 m/s. A metal-in-gap (MIG) head (gap length 0.15 µm, track width 1.0 µm) was employed for recording. The recording current was set to the optimal recording current of each tape. A giant magnetoresistive (GMR) head with a read width (reproduction element width) of 0.50 µm, a shield spacing of 0.1 µm, and an element thickness of 15 nm was employed as the reproduction head. A signal was recorded at a linear recording density of 540 kbpi. The reproduction signal was measured with a spectrum analyzer made by Advantest Corporation to obtain the output peak waveform of the carrier signal. The output strength at the top of the peak and the frequency of the skirt portion of the peak corresponding to a strength of 3% of the output strength at the top of the peak were determined. The integral value of the high spectrum of the frequency on the high frequency side of the skirt portion was adopted as Noise A, and the integral value of the low spectrum of the frequency on the low frequency side of the skirt portion was adopted as Noise B. The sum of Noise A and Noise B was adopted as the noise signal strength. The integral value of the spectra corresponding to other peak portions was denoted as the signal strength (Signal) and the ratio to noise was calculated. Adopting the value of Comparative Example 1 as 0.0 [dB], relative values were calculated from the value of Comparative Example 1 for the other examples and comparative examples. When making evaluations based on this index, a SNRsk that was greater than or equal to −0.5 dB corresponds to a value that is adequate to meet market performance requirements.

(2) Change in SNR due to repeated running

The change in the SNR due to repeated running was measured by the following method using a ½ inch (0.0127 meter) reel tester on which a head had been secured. The relative speed of the head/tape was set to 5.5 m/s. An MIG head (gap length 0.15 μm, track width 1.0 μm) was employed for recording. The recording current was set to the optimal recording current of each tape. A GMR head with a read width (reproduction element width) of 0.50 μm, a shield spacing of 0.1 μm, and an element thickness of 15 nm was employed as the reproduction head. A signal was recorded at a linear recording density of 540 kbpi. The reproduction signal was measured with a spectrum analyzer made by Advantest Corporation, and the ratio of the output of the carrier signal to the integrated noise of the full spectral band was adopted as the SNR. Repeated running was conducted up to 5,000 back and forth passes of 1,000 m per pass and the SNR was measured after each back and forth pass. The SNR of the first pass was denoted as 0 and the SNR after 5,000 back and forth passes was evaluated in dB units. A degree of decrease in the SNR of less than or equal to 1.0 dB corresponds to a value that is adequate to meet market performance requirements.

(3) Measurement of the bit error rate

The bit error rate was measured by the following method using a ½ inch (0.0127 meter) reel tester on which a head had been secured. Recording was conducted at a linear recording density of 330 kbpi. Reproduction was repeated and the ratio of the number of erroneous bits to the number of bits written was adopted as the bit error rate. The data-dependent noise-predictive maximum-likelihood (DD-NPML) was used to process the reproduction signal. This measurement was repeatedly conducted by selecting 6 points within linear recording densities of 330 to 550 kbpi. The SNR measured for each linear recording density was plotted on the X-axis and the error rate was plotted on the Y-axis. The error rate of the portion where the SNR corresponded to 14 dB was adopted as the bit error rate. A bit error rate of less than or equal to $1.00 \times 10^{-4}$ corresponds to a value that is adequate to meet market performance requirements.

(4) Quantity of sodium extracted

The quantity of sodium extracted was determined by the method set forth above for each of the magnetic recording media of the examples and comparative examples.

The results of the above are given in Table 2.

TABLE 2

| | Type of Colloidal Silica | D2/D1 | Thickness of nonmagnetic layer (μm) | Quantity of sodium extracted [ppm] | SNRsk* | Decrease in SNR [dB] | Bit error rate |
|---|---|---|---|---|---|---|---|
| Ex. 1 | A | 1.287 | 0.45 | 24.5 | 0.1 | 0.2 | $6.03 \times 10^{-5}$ |
| Ex. 2 | B | 1.249 | 0.45 | 23.4 | 0.2 | 0.1 | $3.06 \times 10^{-5}$ |
| Ex. 3 | C | 1.234 | 0.45 | 25.6 | 0.3 | 0.2 | $4.60 \times 10^{-6}$ |
| Ex. 4 | D | 1.225 | 0.45 | 23.2 | 0.5 | 0 | $8.90 \times 10^{-7}$ |
| Ex. 5 | E | 1.226 | 0.45 | 26.8 | 0.5 | 0.3 | $8.00 \times 10^{-7}$ |
| Ex. 6 | F | 1.219 | 0.45 | 23.4 | 0.6 | 0.3 | $7.60 \times 10^{-7}$ |
| Ex. 7 | G | 1.215 | 0.45 | 25.6 | 0.6 | 0.4 | $9.01 \times 10^{-7}$ |
| Ex. 8 | H | 1.191 | 0.45 | 28.1 | 0.3 | 0.5 | $1.20 \times 10^{-6}$ |
| Ex. 9 | I | 1.178 | 0.45 | 27.5 | −0.2 | 0.6 | $1.30 \times 10^{-6}$ |
| Ex. 10 | D | 1.225 | 0.55 | 35.0 | −0.3 | 0.8 | $3.20 \times 10^{-6}$ |
| Ex. 11 | D | 1.225 | 0.30 | 21.6 | 0.4 | 0.6 | $8.02 \times 10^{-7}$ |
| Ex. 12 | D | 1.225 | 0.20 | 19.8 | 0.5 | 0.7 | $7.04 \times 10^{-7}$ |
| Ex. 13 | D | 1.225 | 0.10 | 14.8 | 0.5 | 0.8 | $1.50 \times 10^{-6}$ |
| Comp. Ex. 1 | Colloidal Silica prepared by water glass method | 1.390 | 0.10 | 124.3 | 0.0 | 2.7 | $1.13 \times 10^{-4}$ |
| Comp. Ex. 2 | MEK-ST-ZL made by Nissans Chemical Industries, Ltd. | 1.616 | 1.00 | 135.3 | −2.9 | 3.2 | $5.01 \times 10^{-4}$ |
| Comp. Ex. 3 | MEK-ST-ZL made by Nissans Chemical Industries, Ltd. | 1.616 | 0.45 | 131.3 | −0.1 | 2.7 | $3.02 \times 10^{-4}$ |
| Comp. Ex. 4 | J | 1.313 | 0.45 | 24.6 | −1.1 | 0.4 | $2.04 \times 10^{-4}$ |
| Comp. Ex. 5 | K | 1.141 | 0.45 | 23.3 | −1.4 | 2.3 | $2.01 \times 10^{-6}$ |
| Comp. Ex. 6 | D | 1.225 | 0.80 | 26.6 | −2.1 | 2.1 | $4.06 \times 10^{-4}$ |

*Relative value with the value of Comp. Ex. 1 as 0.0 dB.

Based on the results given in Table 2, the magnetic tapes of the examples were determined to afford better electromagnetic conversion characteristic (SNR) both during initial running and during repeated running than the magnetic tapes of the comparative examples.

The magnetic tapes of the examples were also determined to afford low bit error rates.

An aspect of the present invention is useful in the field of manufacturing magnetic recording media.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic recording medium,
which comprises a nonmagnetic layer comprising nonmagnetic powder and binder on a nonmagnetic support, and comprises a magnetic layer comprising ferromagnetic powder and binder on the nonmagnetic layer,
wherein a thickness of the nonmagnetic layer ranges from 0.10 to 0.60 μm; and
the magnetic layer further comprises nonmagnetic filler satisfying equation 1 below and having a Vickers hardness of less than or equal to 122 N/mm$^2$:

$$1.150 \leq D2/D1 \leq 1.300 \qquad \text{Equation 1:}$$

wherein, in equation 1, D1 is a value, with a unit of μm, obtained from equation 2 below:

$$D1 = \frac{6}{\rho \cdot S}, \qquad \text{Equation 2}$$

D2 is an average particle size, with a unit of μm, of the nonmagnetic filler, and
in Equation 2, ρ denotes a density, with a unit of g/cm$^3$, of the nonmagnetic filler and S denotes a specific surface area, with a unit of m$^2$/g, of the nonmagnetic filler.

2. The magnetic recording medium according to claim 1, wherein the nonmagnetic filler is colloidal particles.

3. The magnetic recording medium according to claim 1, wherein the nonmagnetic filler is silica colloidal particles.

4. The magnetic recording medium according to claim 1, wherein a quantity of sodium that is extracted into water from the nonmagnetic layer and magnetic layer is less than or equal to 100.0 ppm based on weight.

5. The magnetic recording medium according to claim 1, wherein the magnetic layer further comprises nonmagnetic filler with a Vickers hardness of greater than or equal to 123 N/mm$^2$.

6. The magnetic recording medium according to claim 5, wherein the nonmagnetic filler with a Vickers hardness of greater than or equal to 123 N/mm$^2$ is alumina.

7. The magnetic recording medium according to claim 1, wherein D2 ranges from 50 to 200 nm.

8. The magnetic recording medium according to claim 1, wherein a thickness of the magnetic layer ranges from 10 to 100 nm.

9. The magnetic recording medium according to claim 1, wherein an average particle size of the ferromagnetic powder ranges from 10 to 50 nm.

10. A magnetic signal reproducing device,
which comprises a magnetic recording medium and a magnetic reproduction head,
wherein the magnetic recording medium is a magnetic recording medium which comprises a nonmagnetic layer comprising nonmagnetic powder and binder on a nonmagnetic support, and comprises a magnetic layer comprising ferromagnetic powder and binder on the nonmagnetic layer,
wherein a thickness of the nonmagnetic layer ranges from 0.10 to 0.60 μm; and
the magnetic layer further comprises nonmagnetic filler satisfying equation 1 below and having a Vickers hardness of less than or equal to 122 N/mm$^2$:

$$1.150 \leq D2/D1 \leq 1.300 \qquad \text{Equation 1:}$$

wherein, in equation 1, D1 is a value, with a unit of μm, obtained from equation 2 below:

$$D1 = \frac{6}{\rho \cdot S}, \qquad \text{Equation 2}$$

D2 is an average particle size, with a unit of μm, of the nonmagnetic filler, and
in Equation 2, ρ denotes a density, with a unit of g/cm$^3$, of the nonmagnetic filler and S denotes a specific surface area, with a unit of m$^2$/g, of the nonmagnetic filler.

11. The magnetic signal reproducing device according to claim 10, wherein a reproduction element width of the magnetic reproduction head ranges from 0.09 to 1.00 μm.

12. The magnetic signal reproducing device according to claim 10, wherein the nonmagnetic filler is colloidal particles.

13. The magnetic signal reproducing device according to claim 10, wherein the nonmagnetic filler is silica colloidal particles.

14. The magnetic signal reproducing device according to claim 10, wherein a quantity of sodium that is extracted into water from the nonmagnetic layer and magnetic layer is less than or equal to 100.0 ppm based on weight.

15. The magnetic signal reproducing device according to claim 10, wherein the magnetic layer further comprises nonmagnetic filler with a Vickers hardness of greater than or equal to 123 N/mm$^2$.

16. The magnetic signal reproducing device according to claim 15, wherein the nonmagnetic filler with a Vickers hardness of greater than or equal to 123 N/mm$^2$ is alumina.

17. The magnetic signal reproducing device according to claim 10, wherein D2 ranges from 50 to 200 nm.

18. The magnetic signal reproducing device according to claim 10, wherein a thickness of the magnetic layer ranges from 10 to 100 nm.

19. The magnetic signal reproducing device according to claim 10, wherein an average particle size of the ferromagnetic powder ranges from 10 to 50 nm.

* * * * *